United States Patent [19]

Sakamoto

[11] 4,368,950
[45] Jan. 18, 1983

[54] IMAGE OBSERVATION DEVICE HAVING GLASS PILED HALF MIRROR

[75] Inventor: Takashi Sakamoto, Kyoto, Japan

[73] Assignee: Dainippon Screen Mfg., Co., Ltd., Kyoto, Japan

[21] Appl. No.: 210,314

[22] Filed: Nov. 25, 1980

[30] Foreign Application Priority Data

Dec. 1, 1979 [JP] Japan .......................... 54-166524[U]

[51] Int. Cl.³ ............................................. G02B 27/10
[52] U.S. Cl. ..................................... 350/174; 350/171
[58] Field of Search .................... 350/174, 173, 171; 356/392, 393, 394, 390, 389, 399, 400, 401; 355/66

[56] References Cited

U.S. PATENT DOCUMENTS 3,419,898 12/1968 Baldwin et al. ..................... 350/174

FOREIGN PATENT DOCUMENTS 1303466 1/1973 United Kingdom ................ 356/394

*Primary Examiner*—Jon W. Henry
*Attorney, Agent, or Firm*—Armstrong, Nikaido, Marmelstein & Kubovcik

[57] ABSTRACT

An image observation device having a glass piled half mirror composed of a translucent reflecting body and transparent bodies arranged at both sides of the reflecting body and having a substantially equal thickness. A plurality of images are disposed in symmetry with respect to a plane of symmetry constituted by the half mirror surface. Images are correctly superposed over entire portions thereof, without any offset, when these images are observed.

2 Claims, 4 Drawing Figures

IMAGE OBSERVATION DEVICE HAVING GLASS PILED HALF MIRROR

BACKGROUND OF THE INVENTION

The present invention relates to an image observation device and, more particularly, to an image observation device making use of a half mirror for observing a plurality of images in a superposed state.

Conventional image observation devices of the type described have a glass provided at its one side with a translucent reflecting surface. The images to be observed are disposed in symmetry with each other with respect to the symmetry plane constituted by the half mirror surface. The transmitted image of one image and the reflected image of the other image are observed in a superposed state from a point remote from the half mirror surface. In this observation device, the transmitted image and the reflected image are not correctly aligned with each other but are offset from each other to cause some inconvenience in the observation. This problem can be overcome to some extent by using a glass plate having an extremely small thickness. This solution, however, has a practical limit because it is necessary to use a considerably large thickness in order to preserve the flatness of the half mirror, when the images to be observed are comparatively large.

SUMMARY OF THE INVENTION

It is, therefore, an object of the invention to provide an image observation device having a novel construction and capable of eliminating the drawbacks of the prior art.

It is another object of the invention to provide a less-expensive and quite simple image observation device which permits an observation of a plurality of images in a highly accurately superposed state.

To these ends, according to the invention, there is provided an image observation device using a half mirror, characterized by comprising a half mirror having transparent bodies of a substantially equal thickness and constituting both sides of the half mirror.

The image observation device thus constructed simply permits the images to be observed in a highly accurately superposed condition.

According to an embodiment of the invention, the transparent bodies having an equal thickness and made of the same material constitute both side parts of a glass piled half mirror.

According to another embodiment, a plurality of images are disposed at symmetrical positions with respect to the plane of symmetry constituted by the half mirror surface.

This arrangement makes it possible to equalize the optical distances between two images and the view point and, at the same time, to maintain the light transmitted from the transparent body to the view point and the light reflected from the transparent body to the view point in the same direction.

According to still another embodiment, the image observation device is provided with a register pin for locating the plurality of images.

DESCRIPTION OF THE PREFERRED EMBODIMENTS

Figure 1:
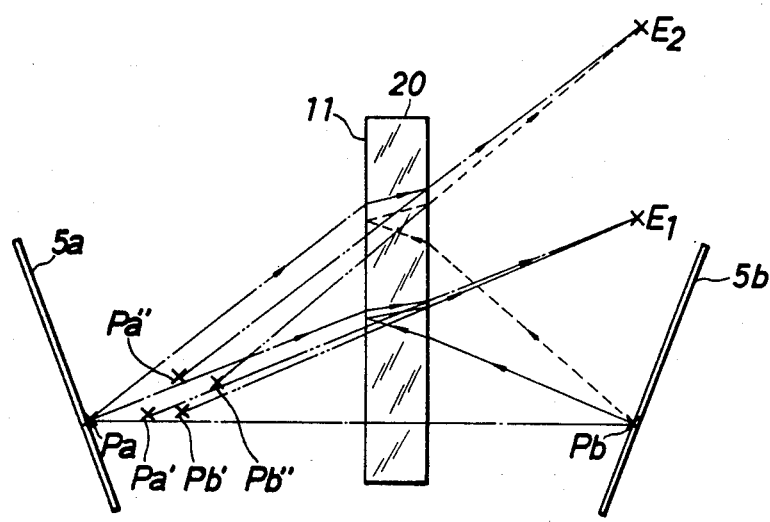
FIG. 1 is a schematic diagramatic illustration of the observation of composite image composed by a conventional half mirror.

In the conventional image observation device employing a half mirror, the half mirror is composed of a glass sheet 20 and a translucent reflection surface 11 attached to one side of the glass sheet 20, as shown in FIG. 1. An image Pb on one of image plates, 5b, is observed as if there are images on different points Pb' and Pb'', through the glass sheet 20 and the translucent reflecting surface 11, depending on the positions $E_1$ and $E_2$ of view point. Also, an image Pa on the other image plate 5a placed in symmetry with the plate 5b with respect to the translucent reflecting surface 11 is observed as if it is on different positions Pa' and Pa'' when viewed from the different view points $E_1$ and $E_2$. In this half mirror, however, the points Pa' and Pb' and the points Pa'' and Pb'' are not perfectly aligned or superposed when viewed from the view points $E_1$ and $E_2$, respectively. This is because, as will be seen from FIG. 1, the direction and distance of travel of the light from the image Pa to a view point are different from those of the light from the image Pb to the same view point. This is attributable to the fact that, while one of the lights has only to transmit the glass sheet 20 in one direction, the other light has to make a reciprocation through the glass sheet.

It may be possible to precisely superpose the two images by slightly displacing the image plates 5a and 5b from the positions of symmetry. This solution, however, is not practical because such a change of position of the image plates has to be made at each time of change of the view point, because the apparent positions of the image, i.e. points Pa' and Pa'' differ depending on the view points. In addition, since the image plates 5a and 5b have certain areas, it is impossible to obtain a perfect overlapping or superposition of two images over the entire area, even when two images precisely lap at a point on the image plate. This means that the images are observed in duplicate and vague, inconveniently.

Needless to say, the same inconvenience is encountered also when the translucent reflecting plate 11 is positioned at the right side of the glass sheet, i.e. at the same side of the image plate 5b.

This inconvenience would be overcome if the thickness of the glass sheet is reduced extremely. This solution, however, is also impractical because the glass sheet is required to have a considerably large thickness in order to maintain the flatness of the half mirror, particularly when the size of the image to be observed is comparatively large.

Figure 2:
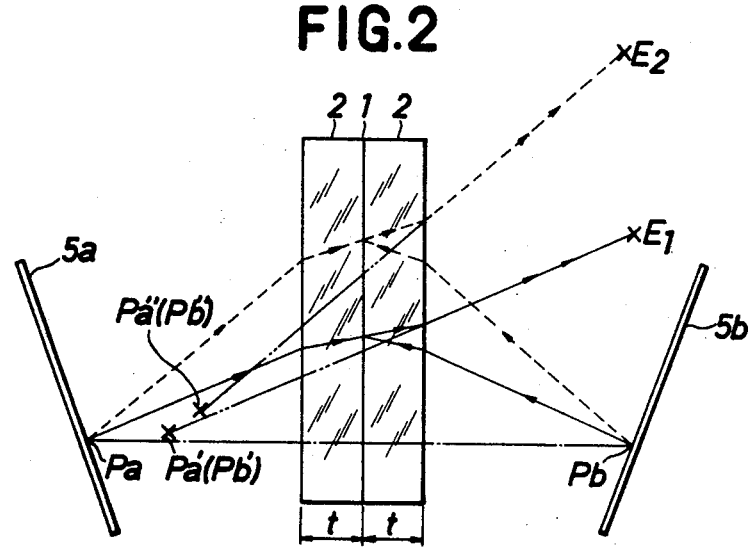
FIG. 2 is a schematic diagramatic illustration of the theory of image composition by a half mirror in accordance with the present invention.

The principle of the device of the invention will be described hereinunder with reference to FIG. 2.

The image observation device of the invention has a half mirror composed of glass sheets 2 and 2 of an identical thickness t disposed to clamp therebetween a translucent reflecting surface 1. The image plates 5a and 5b are disposed in symmetry with each other with respect to the plane of symmetry constituted by the translucent reflecting surface 1. As will be seen also from the drawings, the light from the image Pb and reflected by the translucent reflecting plate 1 and the light from the image Pa and transmitted through the same have the same direction and distance of travel, irrespective of the position of the view point, i.e. at whichever position $E_1$ and $E_2$ the view point may be located. Namely, the images Pa and Pb are observed in perfectly overlapping state, although the image Pa appears to be present at points Pa' and Pa'' when viewed from view points $E_1$ and $E_2$, respectively.

This means that two images are perfectly superposed at all portions thereof, irrespective of the position of the view point, provided that the image plates 5a and 5b are located in perfect symmetry.

A practical application of the invention to an observation device of a printing plate making process will be described hereinunder with specific reference to FIG. 3.

A reference numeral 3 designates a support for supporting the half mirror portion shown at 1, 2 and 2 constituted by a translucent reflecting surface 1 and glass sheets 2 and 2. The support 3 is fixed to a base 4. The reference numeral 55a designates a film original plate which is illuminated from the back side thereof by a light emitted from a light source 8 and diffused by a light diffusing plate 7, through a filter 6a. Plate 55b is also illuminated from the back side in the same manner as the film original plate 55a. Preferably, the filters 6a and 6b have complementary colors. Light source boxes 9 and 9 are supported through legs by the base 4, and are provided at their upper end portions with a plurality of register pins 10 and 10 for locating film original plates 55a and 55b. The arrangement is such that the film original plates 55a and 55b are automatically located in symmetry with each other with respect to the plane of symmetry constituted by the translucent reflecting surface 1, as these plates are fitted to respective register pins.

Figure 4:
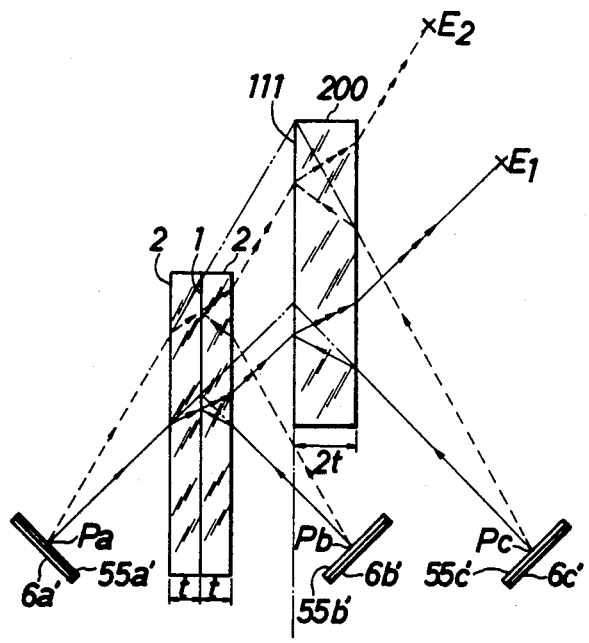
FIG. 4 illustrates the theory of observation of three plate films in superposed state.

FIG. 4 shows another practical example in which three original film plates of three primary colors of ink are to be observed. An original plate film 55a' (e.g., cyanine positive) and an original plate film 55b' (e.g., magenta positive) are disposed in symmetry with each other with respect to a plane of symmetry constituted by the translucent reflecting plate 1, while the remainder original plate film 55c' is disposed in symmetry with the original plate film 55a' with respect to a plane of symmetry constituted by another translucent reflecting surface 111. The half mirror is constituted by the translucent reflecting surface 1 and glass sheets 2 and 2 of the same thickness t and same material attached to both sides of the translucent reflecting plate 1, while the other half mirror is composed of a glass sheet 200 of the same material as the glass sheet 2 and having a thickness 2t with a translucent reflecting plate 111 provided at the left side thereof, and is disposed in parallel with the half mirror portion 1, 2 and 2.

As will be understood also from the drawings, when the same image portions Pa, Pb and Pc of the films 55a', 55b' and 55c' are observed from a view point $E_1$, each light reaches the eye of the observer along a path shown by a full line. Since the lengths of paths from respective points Pa, Pb and Pc to the view point $E_1$ are equal, the points Pa, Pb and Pc are observed in a completely superposed and aligned state when observed from the view point $E_1$. Similarly, the images Pa, Pb and Pc are observed in completely superposed and aligned state when viewed from the view point $E_2$, as the lights travel along paths indicated by broken lines. Thus, the images are observed in completely superposed and aligned state irrespective of the positions of the view point, so that the original plate films are observed in superposition over their entire portions. A red filter 6a', a green filter 6b' and a blue filter 6c' are superposed to the cyanine positive film 55a', magenta positive film 55b' and the yellow positive film 55c', respectively, and are illuminated by light sources (not shown) from the lower side. By so doing, an image of composite colors of all plates, i.e. a color image, is observed from the view point $E_1$, so that the quality of each plate can be examined.

The invention is not limited to the described embodiment but can be carried out in various other forms. For instance, in the arrangement shown in FIG. 4, it is possible to dispose at the right side of the translucent reflecting plate 111 a half mirror parallel to the latter and having a thickness 4t, and a further original plate film is disposed in symmetry with the original plate film 55a' with respect to a plane of symmetry constituted by the reflecting surface of this half mirror. By so doing, it is possible to superpose four images. Furthermore, by suitably selecting the thickness of a piled glass sheet in place of the half mirror 111 and 200, a glass piled half mirror can be formed and used.

Figure 3:
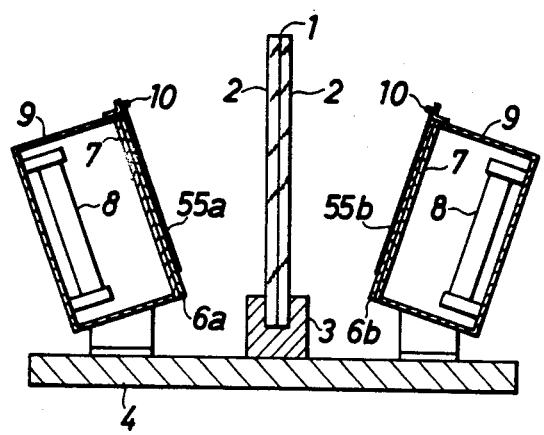
FIG. 3 is a diagramatic sectional view of a device for observing a plurality of image films in a printing plate making process.

In addition, the invention can be applied also to the case where the light from the light source is reflected by reflecting originals, although the lights are transmitted through the originals in the embodiments shown in FIGS. 3 and 4. In such a case, the vertical positional relationship between the original film and the filter should be inversed.

As will be understood from the foregoing description, the invention provides an image observation device which can precisely superpose a plurality of images, in spite of a simplified construction and reduced cost. The device shown in FIG. 3 can effectively be used in the correction of two-color printing plate making which requires a specifically high degree of superposing precision, checking of two major colors in a multicolor printing, checking of correction of positive films after correction, and so forth.

Also, the example shown in FIG. 4 can be used in a simple color correction in multicolor printing plate making in which the requirement for precision of superposition is specifically high.

Thus, the present invention offers a remarkable practical advantage in various uses which require an observation of a plurality of images in a precisely superposed state.

What is claimed is:

1. An image observation device having a glass piled half mirror, for observation of a plurality of images in superposition to each other, said half mirror including two transparent bodies of equal optical property and substantially equal thickness constituting both side portions thereof sandwiching a half mirror surface therebetween, said plurality of images being disposed in symmetry with respect to a plane of symmetry constituted by said half mirror surface, and a pair of light source boxes disposed in symmetry with respect to said plane of symmetry, each box being adapted to hold one image plate producing one of said plurality of images and having a light source therein and a filter thereon, said filters being of different colors complementary to each other, said light sources being adapted to illuminate said image plates through said filters.

2. An image observation device as claimed in claim 1, further comprising register pins on said light source boxes for locating the plurality of image plates producing said plurality of images.

* * * * *